(12) United States Patent
de Goede

(10) Patent No.: US 8,850,090 B2
(45) Date of Patent: *Sep. 30, 2014

(54) USB REDIRECTION FOR READ TRANSACTIONS

(75) Inventor: Hans de Goede, Delft (NL)

(73) Assignee: Red Hat, Inc., Raleigh, NC (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/303,341

(22) Filed: Nov. 23, 2011

(65) Prior Publication Data

US 2013/0132960 A1    May 23, 2013

(51) Int. Cl.
*G06F 13/00* (2006.01)
*G06F 3/00* (2006.01)
*G06F 9/455* (2006.01)
*G06F 9/46* (2006.01)

(52) U.S. Cl.
CPC .............. *G06F 9/46* (2013.01); *G06F 9/45533* (2013.01)
USPC .................... 710/53; 710/35; 710/54; 710/60

(58) Field of Classification Search
USPC ........................................................ 710/53
See application file for complete search history.

(56) References Cited

U.S. PATENT DOCUMENTS

| 7,000,035 | B1 * | 2/2006 | Uchizono et al. | 710/2 |
| 8,121,035 | B2 * | 2/2012 | Oh et al. | 370/235 |
| 2004/0015966 | A1 * | 1/2004 | MacChiano et al. | 718/1 |
| 2011/0296196 | A1 * | 12/2011 | Konetski et al. | 713/189 |

\* cited by examiner

*Primary Examiner* — Henry Tsai
*Assistant Examiner* — Dean Phan
(74) *Attorney, Agent, or Firm* — Lowenstein Sandler LLP

(57) ABSTRACT

Methods and systems for conducting a transaction between a virtual USB device driver and a USB device are provided. A virtual USB manager of a hypervisor receives a one or more data packets from a client. The virtual USB manager stores of the one or more data packets in a buffer. The virtual USB manager dequeues a data packet from the buffer. The virtual USB manager transmits the data packet to the virtual USB device driver for processing.

20 Claims, 5 Drawing Sheets

USB REDIRECTION FOR READ TRANSACTIONS

TECHNICAL FIELD

Embodiments of the present invention relate to a computer system, and more specifically, to a method and apparatus for implementing local and remote read transactions of universal serial bus (USB) devices in a virtualized computing environment.

BACKGROUND

Universal Serial Bus (USB) is an industry standard that defines the cables, connectors and protocols used for connection, communication and power supply between computers and electronic devices. USB was designed to standardize the connection of computer peripherals, such as keyboards, pointing devices, digital cameras, printers, portable media players, disk drives and network adapters to personal computers, both to communicate and to supply electric power. It was designed not to require specific interrupt or DMA resources, and also to be 'hot-pluggable'.

A USB host controller (i.e., a USB host, e.g., in a personal computer) communicates with a USB device (e.g., a printer). USB device communication is based on pipes (logical channels). A pipe is a connection from the USB host controller to a logical entity, found on a USB device, and named an endpoint. Each USB device has one or more endpoints. Each endpoint is a source or sink of data. Data may flow OUT from the USB host to a USB device, or IN from the USB device to the USB host. USB devices talk to the USB host through four different types of USB transfers: control, bulk, isochronous, and interrupt transfers.

Isochronous transfers are data transfers at some guaranteed data rate (often, but not necessarily, as fast as possible) but with possible data loss. Error-free delivery is not guaranteed. Isochronous transfers are employed primarily in applications such as audio data streaming, where it is important to maintain the data flow, but not so important if some data is missed or corrupted. An isochronous transfer uses either an IN transaction or an OUT transaction depending on the type of endpoint. The special feature of these transactions is that there is no handshake packet at the end. Isochronous transfers occur continuously and periodically (e.g., 8000 times per second).

Interrupt transfers are data transfers for devices that need guaranteed quick responses (bounded latency). Interrupt transfers are employed to keep up to date of any changes of status in a device. Examples of their use are for a mouse or a keyboard. Traditionally, interrupt requests on microcontrollers are device generated. However, under USB, if a device requires the attention of the USB host, it should wait until the USB host polls it before it can report that it needs urgent attention. An interrupt request is queued by a USB device driver until the USB host polls the USB device asking for data.

Bulk transfers are data transfers used for large bursty data. Examples include a print-job sent to a printer or an image generated from a scanner. Bulk transfers are designed to transfer large amounts of data with error-free delivery, but with no guarantee of bandwidth.

A control transfer is a bi-directional transfer that uses both an IN and an OUT endpoint. Control transfers are typically used for command and status operations. They are essential to set up a USB device. They are typically bursty, random packets which are initiated by the host and use best effort delivery.

Control and bulk transfers do not have critical timing constraints, but isochronous and interrupt transfers do. With isochronous transfers, the USB device needs to be read/written to up to 8000 times per second and failing to do so results in data loss. Normally this is handled by the Operating Systems (OS) USB stack and USB device drivers by queuing a number of packets in a USB host controller and as soon as the transfer has been received and acknowledged (i.e. processed or completed), re-queuing packets.

Packet completion is signaled to the USB stack by a hardware interrupt, guaranteeing that the USB device driver will be acknowledged of packet completion with minimal latency. To minimize latency (e.g. in audio/video streams), the USB device driver queues the minimum number of packets needed to ensure reliable operation, based on the maximum latency of the USB stack and interrupt handling.

These timing constrains become a problem when redirecting USB traffic from a USB device through a virtual machine to a remote client machine over a network to which the USB device is physically connected. The packets first pass through the USB stack in the machine to which the USB device is physically connected before being passed to the USB stack in the virtual machine (i.e., the guest USB stack). This adds to latency, rendering assumptions about worst case latency invalid. When performing USB redirection to a remote client machine over a network, there is also a network latency component, worsening the latency problem. For example, when a user presses a key of a USB-connected keyboard at a remote client location, the user may perceive a noticeable time delay before seeing the resulting character appear on their terminal screen.

Conventional remedies for the network latency problem include changing the number of packets that a virtual device driver queues. Unfortunately, this requires modifications to the virtual USB device driver, which is undesirable.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
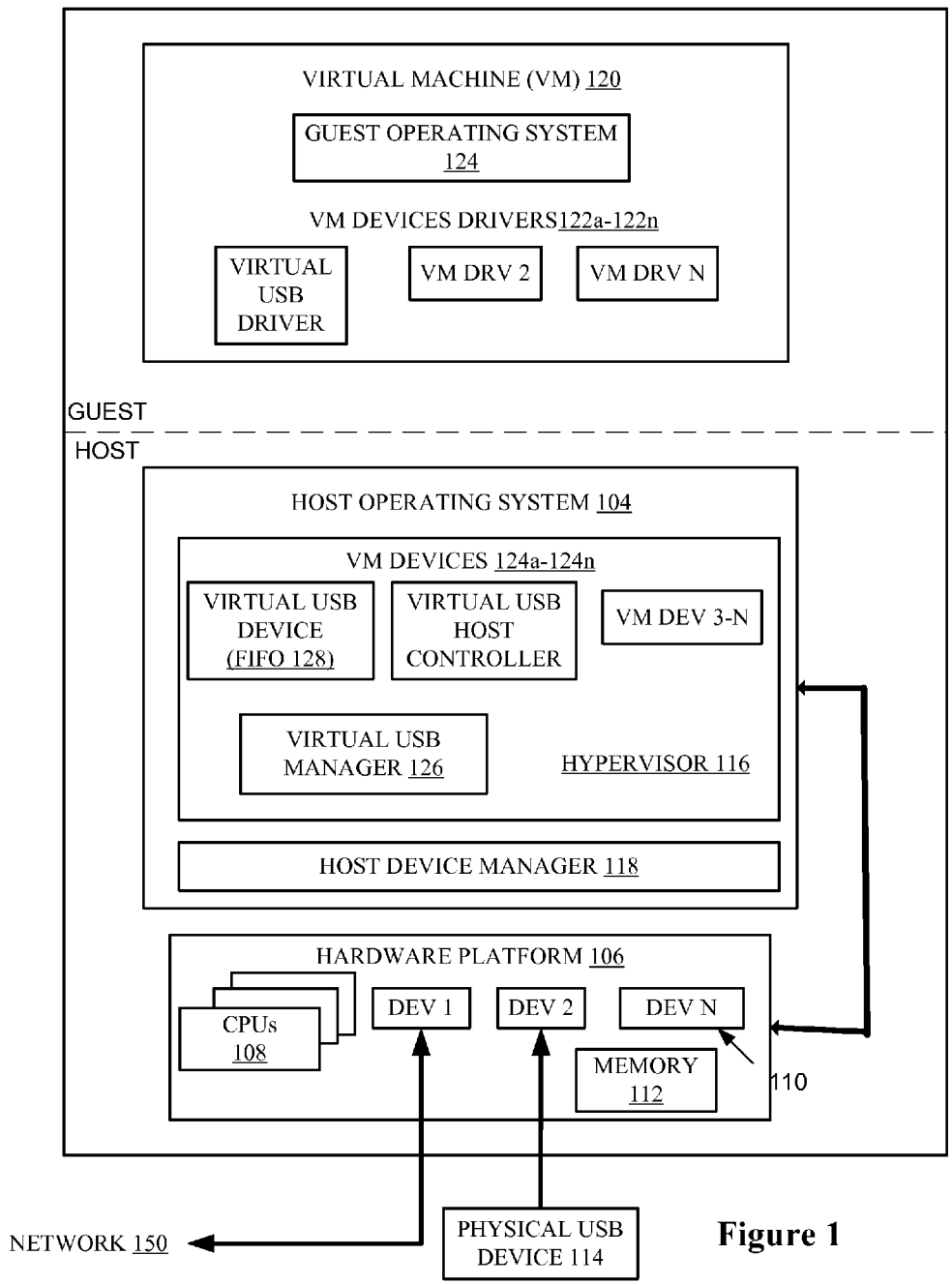
FIG. 1 is a block diagram illustrating one embodiment of a host computer system (i.e., a host) in which embodiments of the present invention may be implemented.

Methods and systems for conducting a transaction between a virtual USB device driver and a client USB device are described herein. In one embodiment, a virtual USB manager of a hypervisor receives one or more data packets from a client USB manager associated with the USB device. The virtual USB manager stores the one or more data packets in a FIFO. The virtual USB manager dequeues a data packet from the FIFO. The virtual USB manager transmits the data packet to the virtual USB device driver for processing. The data packet may be received by the virtual USB manager over a network from the client USB manager on another machine.

In an embodiment, the data packet may be transmitted using a USB isochronous IN transaction. The data packet may be transmitted to the virtual USB device driver at a standard isochronous interval.

In an embodiment, the virtual USB manager receives a command to initiate a transaction from the virtual USB device driver and sends a command to initiate a transaction to the client USB manager. The virtual USB manager starts filling a FIFO with data packets received from the client USB manager and transmits empty packets at a standard isochronous interval to the virtual USB device driver until the FIFO is filled with the predetermined number of data packets. Once the FIFO is filled with the predetermined number of data packets, the virtual USB manager starts taking data packets from the FIFO and transmitting these at a standard isochronous interval to the virtual USB device driver.

In one embodiment, the client USB manager receives a command to initiate a transaction from a virtual USB manager of a hypervisor and creates a predetermined number of packets. The client USB manager queues these packets into the USB host controller's receive queue for deliver to the USB device. Once a packet has been filled by the USB device, the client USB manager forwards the data packet to the virtual USB manager, and re-queues the packet into the USB host controllers receive queue without waiting for the virtual USB device driver to process the data packet. In an embodiment, the client USB manager is operable to continually keep at least one data packet queued for receiving data from the USB device.

In one embodiment, data packets may be received by the virtual USB manager over a network from the client USB manager on another machine (e.g., a client machine).

By keeping at least one packet queued, the client USB manager ensures that the USB device receives a continuous stream of packets, resolving any problems with USB timing. By employing a FIFO, the virtual USB manager ensures that the virtual device driver receives a continuous stream of packets even if there is some jitter in the timing of packets when packets traverse a network or within a host. The size and threshold to which to fill the FIFO depends only on the amount of jitter and the endpoint interval, since the system automatically adapts to the latency of the link between the virtual USB manager and the client USB manager.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram illustrating one embodiment of a host computer system 100 (i.e., the host 100), in which embodiments of the present invention may be implemented. The host 100 may be a host machine such as, for example, a server computer, a gateway computer, or any other suitable computer system that is configurable for operating as a host. The host machine comprises a host operating system 104 (i.e., a host OS 104) and a hardware platform 106. Host OS 104 may include Microsoft Windows®, Linux®, Solaris®, Mac® OS or any other suitable operating system for managing operations on the host 100.

The hardware platform 106 may include one or more central processing units (CPUs) 108, devices 110, and memory 112. The devices 110 may be comprised of one or more hardware and software devices (DEV 1-DEV N), which may be located internally and externally to the host 100. An example of the devices 110 may include a network interface card (NIC) such as an Ethernet network card (e.g., device "DEV 1") for communication over a network 150. The network 150 may be a private network (e.g., a local area network (LAN), wide area network (WAN), intranet, etc.) or a public network (e.g., the Internet).

Other examples of the devices 110 may include sound or video adaptors, photo/video cameras, printer devices, keyboards, displays, a USB host controller (e.g., device "DEV 2"), or any other suitable device intended to be coupled to a computer system. Examples of the memory 112 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, one or more USB device(s) 114 may be externally connectable to the host 100 via the USB host controller (e.g., DEV 2) integrated with the host 100. In an embodiment, the USB host controller may be an integrated circuit (IC) separate from the one or more CPUs 108. In another embodiment, the USB host controller may be integrated with the one or more CPUs 108.

In a virtualized environment, the host 100 is additionally configured with one or more virtual machines (VMs) 120. VM 120 is a portion of software that, when executed on appropriate hardware, creates an environment that permits the virtualization of an actual physical computer system. Each of the VMs 120 may function as a self-contained platform, comprising and running a corresponding guest operating system (OS) 124. The guest OS 124 in each of the VMs 120 may run the same or different operating systems. Similar to the host OS 104, the guest OS 124 may include Microsoft Windows®, Linux®, Solaris®, Mac® OS or any other suitable operating system for managing operations associated with a virtualization environment. A VM 120 may further comprise one or more virtual device drivers 122a-122n (i.e. VM device drivers 122a-122n) associated with one or more virtual devices 124a-124n described in more detail below.

A hypervisor 116, which emulates the underlying hardware platform 106 for the VMs 120, is provided and may run on the host OS 104. A hypervisor is also known as a virtual machine monitor (VMM), a kernel-based hypervisor or a host operating system. The hypervisor 116 may support multiple VMs 120 residing on the host 100. Alternatively, more than one hypervisor 116 (not shown) may be provided to support multiple VMs 120 residing on the host 100. A host device manager 118 manages the (real) devices 110 of the host 100. The hypervisor 116 is configured to emulate the one or more virtual devices 124a-124n in cooperation with the virtual device drivers 122a-122n residing on a virtual machine 120.

In one embodiment, one of the virtual devices 124a-124n emulated by the hypervisor 116 may be a virtual USB device 124a which is configured to communicate with a virtual USB host controller 124b in cooperation with a virtual USB manager 126. The virtual USB device 124a includes a buffer (e.g., first-in first-out (FIFO) buffer) 128 for storing USB isochronous read packets. The FIFO 128 and the virtual USB manager 126 ensure that no packet may be lost in communication with a physical USB device located on a remote client machine over the network 150. The FIFO 128 is also controlled by the virtual USB manager 126 to insure that the virtual USB device driver 122a receives a continuous stream of packets at a standard isochronous interval (e.g., 8000 packets per second).

Figure 2:
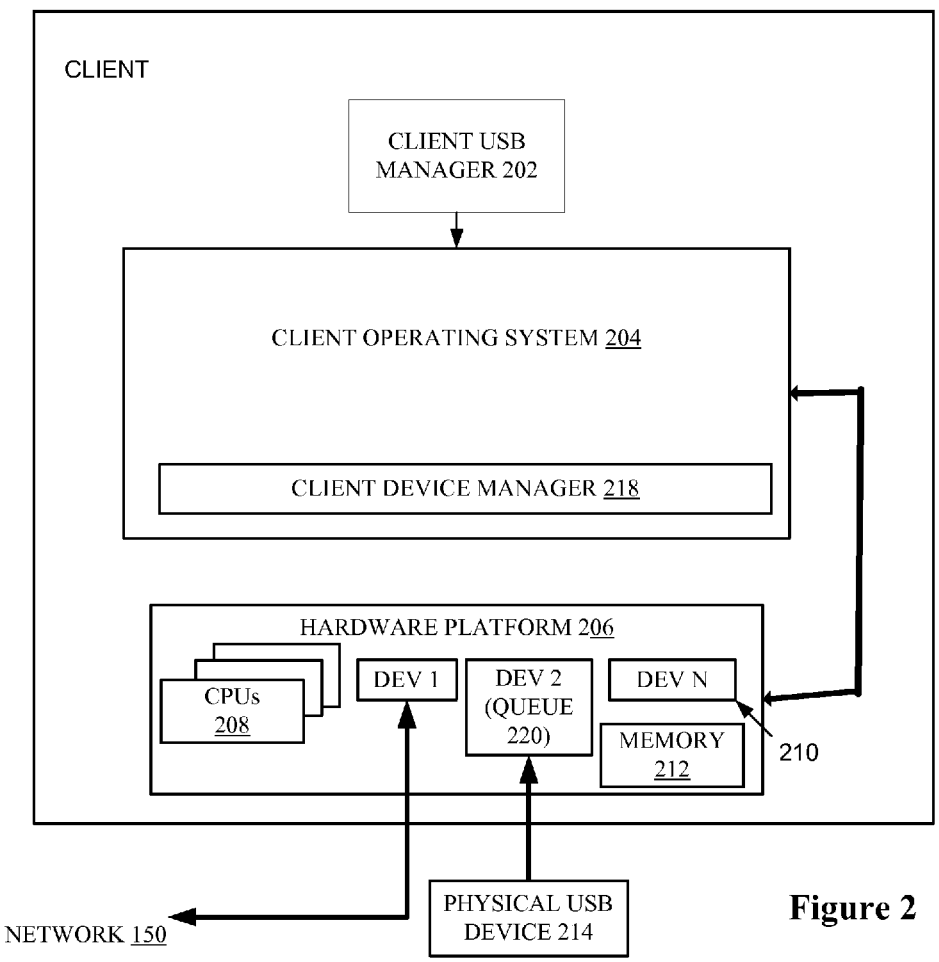
FIG. 2 is a block diagram illustrating one embodiment of one or more client computer systems (i.e., a client) configured to communicate with the host over a network, in which embodiments of the present invention may be implemented.

FIG. 2 is a block diagram illustrating one embodiment a client computer system 200 (i.e., the client 200), configured to communicate with the host 100 over the network 150, in which embodiments of the present invention may be implemented. The client 200 may include a client machine such as, for example, a server computer, a gateway computer, or any other suitable computer system that is configurable for operating as a client. The client machine comprises a client operating system 204 (i.e., a client OS 204) and a hardware platform 206. Client OS 204 may include Microsoft Windows®, Linux®, Solaris®, Mac® OS or any other suitable operating system for managing operations on the client 200.

The hardware platform 206 may include one or more central processing units (CPUs) 208, devices 210, and memory 212. The devices 210 may be comprised of one or more hardware and software devices (DEV 1-DEV N), which may be located internally and externally to the client 200. An example of the devices 210 may include a network interface card (NIC) such as an Ethernet network card (e.g., device "DEV 1") for communication over a network 150. The network 150 may be a private network (e.g., a local area network (LAN), wide area network (WAN), intranet, etc.) or a public network (e.g., the Internet).

Other examples of the devices 210 may include sound or video adaptors, photo/video cameras, printer devices, keyboards, displays, a USB host controller (e.g., device "DEV 2"), or any other suitable device intended to be coupled to a computer system. Examples of the memory 212 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, one or more USB device(s) 214 may be externally connectable to the client 200 via the USB host controller (e.g., DEV 2) integrated with the client 200. In an embodiment, the USB host controller may be an integrated circuit (IC) separate from the one or more CPUs 208. In another embodiment, the USB host controller may be integrated with the one or more CPUs 208.

In an embodiment, a USB manager application 202 (i.e., client USB manager 202) running on the client OS 204 may execute a request to read or write data to/from the USB host controller (e.g., DEV 2), the physical USB device(s) 214, and/or a network interface controller (NIC) or a network card such as an Ethernet network card (e.g., device "DEV 2") for communication over the network 150. The network 150 may be a private network (e.g., a local area network (LAN), wide area network (WAN), intranet, etc.) or a public network (e.g., the Internet).

In one embodiment, the USB host controller (e.g., DEV 2) includes a receive queue 220 (the queue 220) for receiving USB isochronous read packets from the physical USB device 214 to be transmitted by the client USB manager 202 to the virtual USB manager 126. When the virtual USB manager 126 receives a command to prepare to receive an isochronous read stream from the virtual USB device driver 122a, the virtual USB manager 126 allocates the FIFO 128 and starts sending empty data packets to the virtual USB device driver 122a at a standard isochronous interval. The read packets which are queued in the queue 220 are a reusable resource. When the client USB host controller (e.g., DEV2 of FIG. 2) has received a read packet from the physical USB device 214, it hands the read packet to the client USB manager 202, which extracts the data from received read packets from the USB host controller (e.g., DEV 2), transmits the data to the virtual USB manager 126, and queues the empty packet back into the queue 220. This last step is called "re-queuing."

Figure 3:
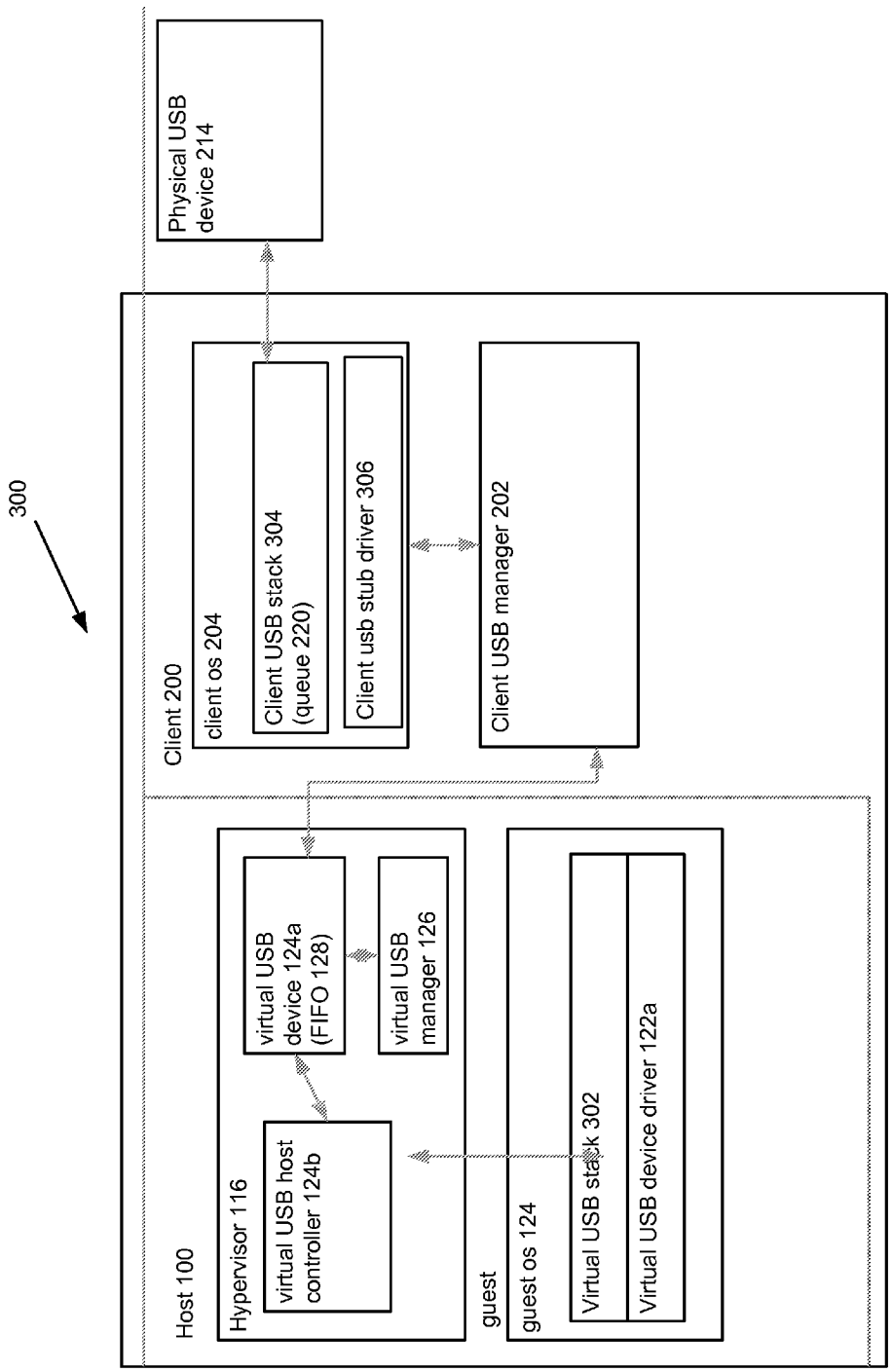
FIG. 3 is a block diagram illustrating one embodiment of a software architecture, in which embodiments may be implemented for USB data transmission between the client of FIG. 2 and the host of FIG. 1 over the network.

FIG. 3 is a block diagram illustrating one embodiment of a system architecture 300, in which embodiments of the present invention may be implemented for USB data transmission between the client 200 of FIG. 2 and the host 100 of FIG. 1 over the network 150. The host 100 is configured to emulate one or more virtual machines (i.e., the VMs 120) that include the guest OS 124 which is itself configured to include a virtual USB stack 302 for implementing the USB protocol and one or more virtual USB device driver(s) 122a for emulating the control of one or more virtual USB device(s) 124a through commands to and data received from the virtual USB device(s) 124a.

In an embodiment, the hypervisor 116 is configured to emulate the virtual USB host controller 124b and one or more virtual USB devices 124a under the control of the virtual USB manager 126 as described above corresponding to the physical USB host controller (e.g., DEV 2) and the one or more physical USB device(s) 214 externally connectable to the client 200 of FIG. 2. A client OS 204 may be configured with a client USB stack 304 for implementing the USB protocol and a client USB stub driver 306 for providing a stub API interface for receiving commands from client USB manager 202 and data from the physical USB device 214. In one embodiment, the physical USB device 214 configured as one or more USB endpoints may communicate with the client OS 204 and ultimately the virtual USB stack 302 and virtual USB device driver(s) 122a via a client USB stack 304 and a client USB stub driver 306 integrated with the client OS 204.

In an embodiment, the client 200 may also include the client USB manager 202 running on the client OS 204 working in conjunction with the virtual USB manager 126 in the hypervisor 116 of the host OS 104 to hide communication latency between the physical USB device(s) 214 associated with the client 200 and the virtual USB device(s) 124a located in the hypervisor 116 of the host 100. As with USB communication protocols, a real or virtual USB device driver initiates communications with a real or virtual USB device via a real or virtual USB host controller. In such circumstances, communication is initiated by the virtual USB device driver 122a in the guest OS 124 of the host 100 and data transferred either from virtual USB device driver 122a to the physical device(s) 214 or from the latter to the former (possibly) over the network 150 according to one of the four USB transfer types.

Diversion of USB data transfers from a physical USB device (e.g., the USB device 214) to a virtual machine (e.g., the virtual USB stack 302 and the virtual USB device driver(s) 122a) is known as "redirection." Redirection becomes more complicated and latency problems become more severe for data traffic transferred over the network 150 when a computing machine to which a physical USB device is connected (i.e., the client 200, with the host 100 acting as a server) is remotely located and separate from the host 100 on which the VM 120 is located.

For isochronous IN (read) transactions (i.e., streams), the virtual USB device 124a in the hypervisor 116 of the host 100 may be provided with the FIFO 128. The FIFO 128 insures that no packets are lost because of latency issues and is also configured to provide the virtual USB device driver(s) 122 with a continuous stream of data.

For isochronous IN (read) transactions (i.e., streams), the client USB manager 202 may manage the physical USB host controller (e.g., DEV 2) receive queue 220 and continually keep at least one isochronous read packet queued for receiving data from the physical USB device 214. To this effect, the client USB manager 202 is configured to queue a predetermined number of packets in the physical USB host controller receive queue 220. Upon receiving filled data packets from the physical USB device 214, the client USB manager 202 transmits the filled data packets over the network 150 to the FIFO 128 in the virtual USB device 124a in the hypervisor 116 of the host 100. The client USB manager 202 then re-queues each of the packets in the physical USB host controller receive queue 220 without waiting for the virtual USB device driver 122 to have processed the filled data packets in the FIFO 128.

Figure 4:
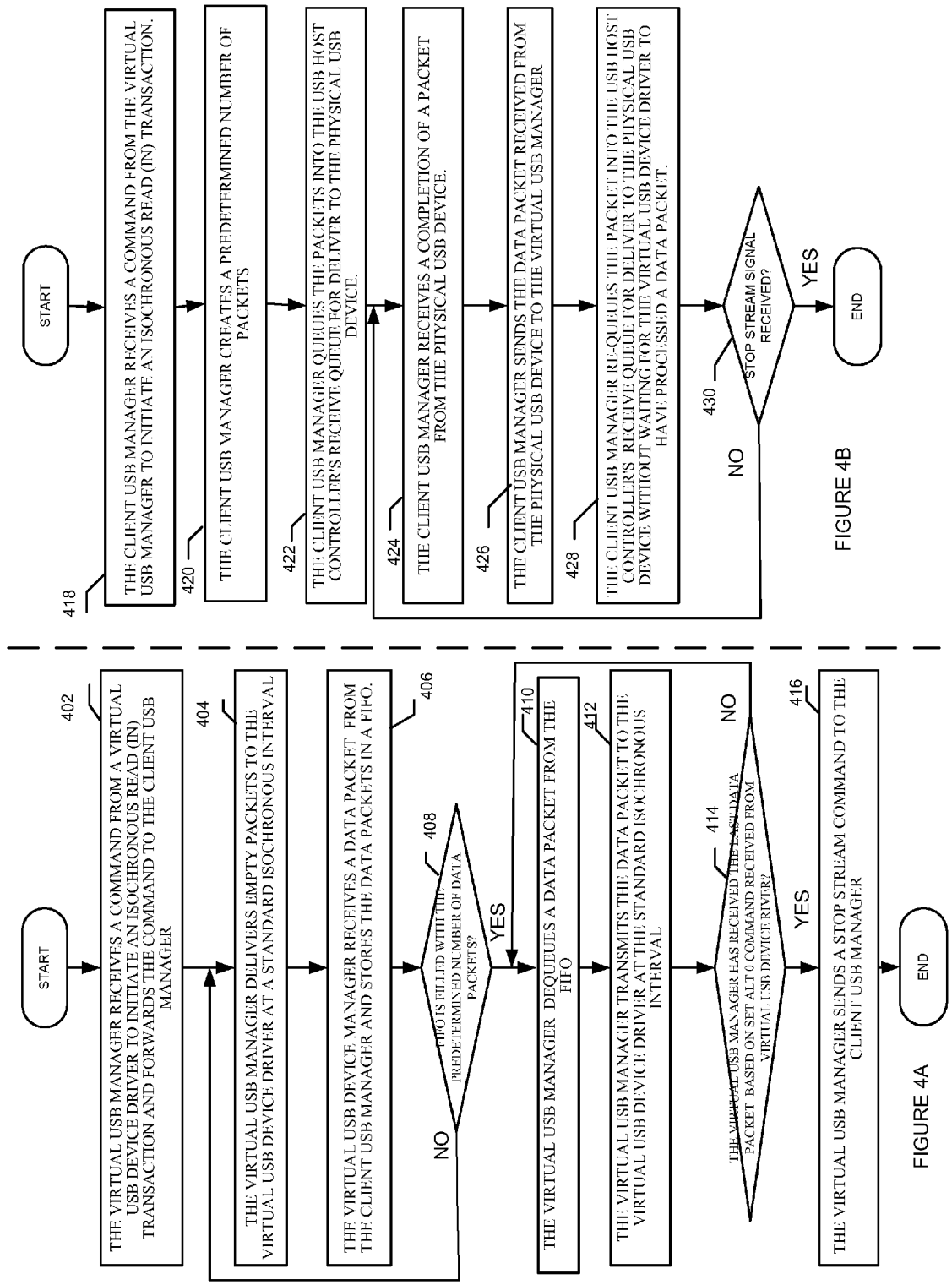
FIG. 4A is a flow diagram illustrating one embodiment of a method for conducting a hidden latency USB isochronous read (IN) transaction between a guest USB device driver and a physical USB device from the point of view of the host.
FIG. 4B is a flow diagram illustrating one embodiment of a method for conducting a hidden latency USB isochronous read (IN) transaction between a guest USB device driver and a physical USB device from the point of view of the client.

FIG. 4A is a flow diagram illustrating one embodiment of a method 400 for conducting a hidden latency USB isochronous read (IN) transaction between a virtual USB device driver 122 and a physical USB device (e.g. the physical USB device 214) from the point of view of the host 100. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 of FIG. 4A is performed primarily by the virtual USB manager 126 in the hypervisor 116 running in the host OS 104 of the host 100.

At block 402, the virtual USB manager 126 receives a command from the virtual USB device driver 122 via the virtual USB stack 302 to initiate an isochronous read (IN) transaction. The virtual USB manager 126 transmits (forwards) the command to the client USB manager 202. In response, the client USB manager 202 creates a predetermined number of data packets and queues these packets into the USB host controller's receive queue 220. At block 404, the virtual USB manager 126 delivers empty packets to the virtual USB device driver 122a at a standard isochronous interval via the virtual USB host controller 124b and the virtual USB stack 302 and stores data packets received from the client USB manager 202 into the FIFO 128.

At block 406, the virtual USB manager 126 receives one or more data packets from the client USB manager 202 and stores the data packets in the FIFO 128. At block 408, if the FIFO 128 is filled with the predetermined number of data packets received from the client USB manager 202, then at block 410 virtual USB manager 126 dequeues a data packet from the FIFO 128; otherwise processing returns to block 404. At block 412, the virtual USB manager 126 transmits the data packet to the virtual USB device driver 122 at a standard isochronous interval via the virtual USB host controller 124b and the virtual USB stack 302. In response, the virtual USB device driver 122 processes the data packet and transmits completions of data packets to the virtual USB manager 126.

At block 414, the virtual USB manager 126 determines whether it has received the last data packet of the isochonous read (IN) transaction based on having received a set alt setting 0 command from the virtual USB device driver 122; otherwise, processing returns to block 410. If, at block 414, the virtual USB manager 126 has received the last packet to be transmitted, then at block 416, it sends a stop stream command to the client USB manager 202 and the transmission terminates.

Note that the virtual USB manager 126 is configured to wait only for the initial filling of the FIFO 128. Also note that the decision as to when the FIFO 128 is full enough is made by the virtual USB manager 126. The client USB manager 202 does not send a special signal for this. Once the virtual USB manager 126 decides that the FIFO 128 is "full enough", the virtual USB manager 126 moves from block 404 to block 410 without the client USB manager 202 being involved.

FIG. 4B is a flow diagram illustrating one embodiment of the method 400 for conducting a hidden latency USB isochronous read (IN) transaction between a virtual USB device driver 122 and a physical USB device (e.g., the physical USB device 214) from the point of view of the client 200. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 of FIG. 4B is performed primarily by the client USB manager 202 running on the client 200.

At block 418, the client USB manager 202 receives a command to initiate an isochronous read (IN) transaction from the virtual USB manager 126. At block 420, the client USB manager 202 creates a predetermined number of packets. At block 422, the client USB manager 202 queues the packets into the USB host controller's (e.g., DEV 2) receive queue 220 for deliver to the physical USB device 218, via the client USB stack 304 and the client USB stub driver 306 integrated with the client OS 204.

At block 424, the client USB manager 202 receives a completion of a queued packet from the physical USB device 218, via the client USB stack 304 and the client USB stub driver 306 integrated with the client OS 204. At block 426, the client USB manager 202 sends the data packet received from the physical USB device 218 to the virtual USB manager 126, which stores the data packet in the FIFO 128. At block 428, the client USB manager 202 re-queues the packet into the USB host controller's (e.g., DEV 2) receive queue 220 for deliver to the physical USB device 218 without waiting for the virtual USB device driver 122 to have processed a data packet. At block 430, the client USB manager 202 determines whether it has received the last data packet of the isochonous read (IN) transaction based on a stop stream signal received from the virtual USB manager 126. If not, then steps 424-430 are repeated. If the client USB manager 202 has received the last packet to be transmitted, then transmission terminates.

In an embodiment, when a physical USB device 214 is connected to a remote client 200, the client USB manager 202 is configured to receive and transmit USB commands and data packets to and from the virtual USB manager 126 in the hypervisor 116 in the host 100 over the network 150. In another embodiment, when the physical device 214 is connected to the host 100 in a virtual environment as depicted in FIG. 1, the client USB manager 202 as well as the virtual USB manager 126 containing the FIFO 128 reside within the hypervisor 116 of the host OS 104. Further, the client OS 204 containing the client USB stack 304 and a client USB stub driver 306 are integrated with the host OS 104.

In such circumstances, management of the host controller receive queue 220 is performed directly by the virtual USB manager 126. USB data packets are passed between the queue 220 and the FIFO 128 in the hypervisor 116 without an intervening network 150 as would be appreciated by one of ordinary skill in the art having the benefit of this disclosure.

By keeping at least one packet queued, the client USB manager 202 ensures that the USB device 214 receives a continuous stream of packets, resolving any problems with USB timing. By employing the FIFO 128, the virtual USB manager 126 ensures that the virtual device driver 122a receives a continuous stream of packets even if there is some jitter in the timing of packets when packets traverse the network 150 or within a host. The size and threshold to which to fill the FIFO 128 depends only on the amount of jitter and the endpoint interval, since the system automatically adapts to the latency of the link between the virtual USB manager 126 and the client USB manager 202.

Figure 5:
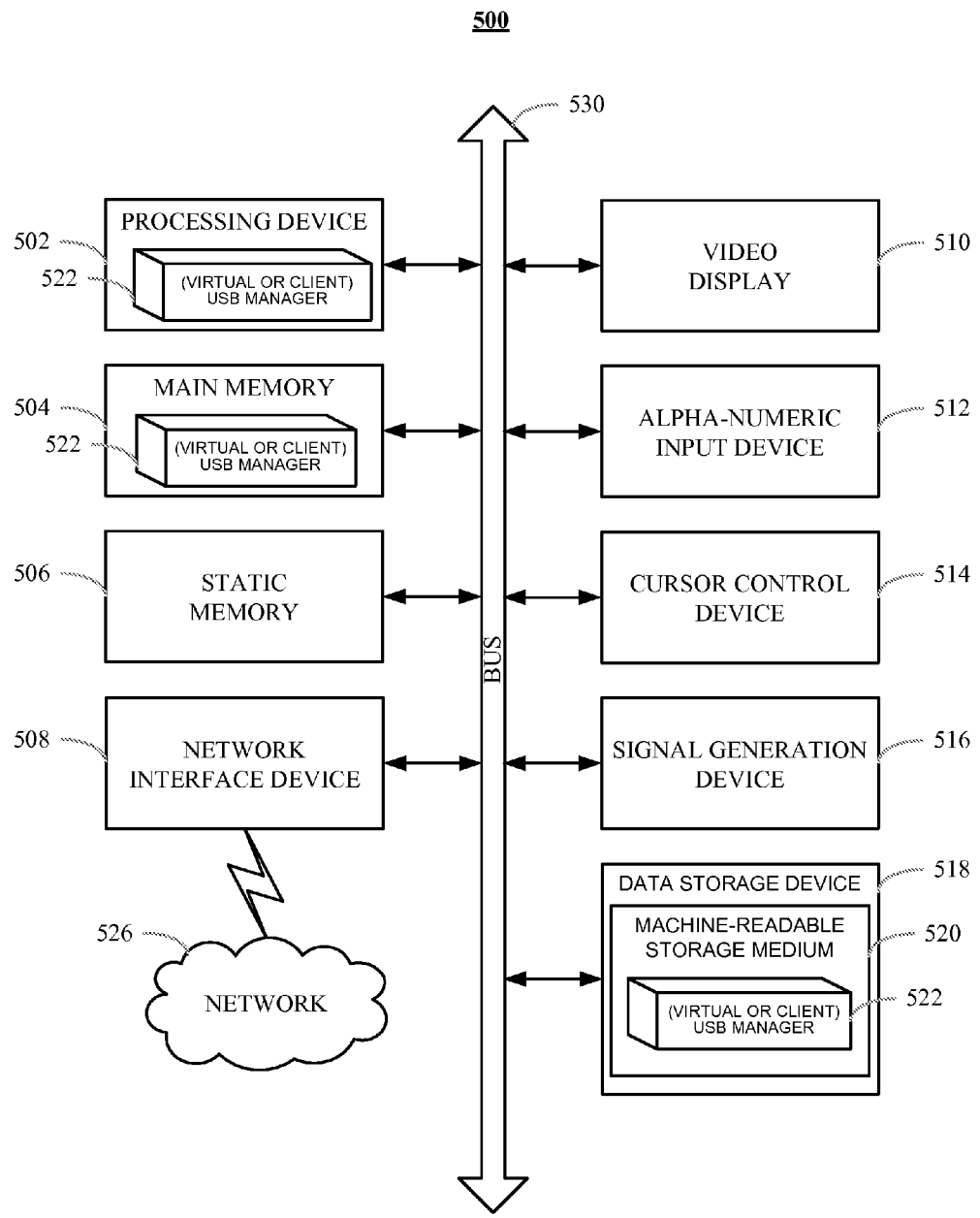
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 630.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the virtual USB manager 126 and/or the client USB manager 202 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 620 having one or more sets of instructions 622 (e.g., the virtual USB manager 126 and/or the client USB manager 202) embodying any one or more of the methodologies of functions described herein. The virtual USB manager 126 and/or the client USB manager 202 may also reside, completely or at least partially, within main memory 504 and/or within processing device 502 during execution thereof by computer system 500; main memory 504 and processing device 502 also constituting machine-readable storage media. The virtual USB manager 126 and/or the client USB manager 202 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    selecting, by a hypervisor of a host computer system, a number of empty packets for en-queuing in a first-in first out buffer (FIFO) and a number of data packets for en-queuing in the FIFO depending on an amount of jitter and an amount of latency in a link between the hypervisor and a client computer system;
    en-queuing, by the hypervisor, the number of empty packets into the FIFO;
    de-queuing, by the hypervisor, an empty packet from the FIFO at an interval;
    transmitting, by the hypervisor, the empty packet to a virtual Universal Serial Bus (USB) device driver at the interval;
    receiving, by the hypervisor, the number of data packets from the client computer system;
    en-queuing, by the hypervisor, the number of data packets into the FIFO;
    de-queuing, by the hypervisor, a packet from the FIFO at the interval; and
    transmitting, by the hypervisor, the packet to the virtual USB device driver at the interval.

2. The method of claim 1, wherein the packet is transmitted by the hypervisor to the virtual USB device driver using a USB isochronous IN transaction.

3. The method of claim 1, wherein the number of data packets is received over a network from the client computer system.

4. The method of claim 1, further comprising:
    receiving, by the hypervisor, a command packet from the virtual USB device driver to initiate a transaction;
    in response to said receiving the command packet,
        transmitting the command packet to the client computer system to start the transaction;
        initiating said selecting the number of empty packets for en-queuing in the FIFO and the number of packets for en-queuing in the FIFO; and
        instantiating the FIFO.

5. The method of claim 1, wherein the interval is a standard isochronous interval.

6. The method of claim 1, further comprising:
    receiving, by the hypervisor, a set alt setting 0 command from the virtual USB device driver; and
    transmitting, by the hypervisor, a stop stream command to the client computer system.

7. The method of claim 1, wherein data packets are received by the hypervisor over a network.

8. The method of claim 1, further comprising:
    receiving, by the hypervisor, a stop stream signal from the hypervisor virtual USB device driver and
    terminating transmission of packets by the hypervisor to the virtual USB device driver.

9. A system, comprising:
    a memory;
    a processing device, coupled to the memory; and
    a hypervisor hosted by the system processing device, the hypervisor to:
        select a number of empty packets for en-queuing in a first-in first out buffer (FIFO) and a number of packets for en-queuing in the FIFO depending on an amount of jitter and an amount of latency in a link between the hypervisor and a client computer system;
        en-queue the number of empty packets into the FIFO;
        de-queue an empty packet from the FIFO at an interval;
        transmit the empty packet to a virtual Universal Serial Bus (USB) device driver at the interval;
        receive the number of data packets from the client computer system;
        en-queue the number of data packets into the FIFO;
        de-queue a packet from the FIFO at the interval; and
        transmit the data packet to the virtual USB device driver at the interval.

10. The system of claim 9, wherein the packet is transmitted by the hypervisor to the virtual USB device driver using a USB isochronous IN transaction.

11. The system of claim 9, wherein the number of data packets is received over a network from the client computer system.

12. The system of claim 9, wherein the interval is a standard USB isochronous interval.

13. The system of claim 9, wherein the hypervisor is further to:
    receive a command packet from the virtual USB device driver to initiate a transaction;
    in response to said receiving the command packet,
        transmit the command packet to the client computer system to start the transaction;
        initiate said selecting the number of empty packets for en-queuing in the FIFO and the number of packets for en-queuing in the FIFO; and
        instantiate the FIFO.

14. The system of claim 9, wherein the hypervisor is further to:
    receive a set alt setting 0 command from the virtual USB device driver; and transmit a stop stream command to the client computer system.

15. A non-transitory computer readable storage medium including instructions that, when executed by a processing device, cause the processing device to perform comprising:

selecting, by a hypervisor of processing device, a number of empty packets for en-queuing in a first-in first out buffer (FIFO) and a number of packets for en-queuing in the FIFO depending on an amount of jitter and an amount of latency in a link between the hypervisor and a client computer system;

en-queuing, by the hypervisor, the number of empty packets into the FIFO;

de-queuing, by the hypervisor, an empty packet from the FIFO at an interval;

transmitting, by the hypervisor, the empty packet to a virtual Universal Serial Bus (USB) device driver at the interval;

receiving, by the hypervisor the number of data packets from the client computer system;

en-queuing, by the hypervisor, the number of data packets into the FIFO;

de-queuing, by the hypervisor, a packet from the FIFO at the interval: and transmitting, by the hypervisor, the packet to the virtual USB device driver at the interval.

16. The non-transitory computer readable storage medium of claim 11, wherein the packet is transmitted by the hypervisor to the virtual USB device driver using a USB isochronous IN transaction.

17. The non-transitory computer readable storage medium of claim 11, wherein the number of data packets is received over a network from the client computer system.

18. The non-transitory computer readable storage medium of claim 11, further comprising:

receiving, by the hypervisor, a command packet from the virtual USB device driver to initiate a transaction;

in response to said receiving the command packet,
transmitting the command packet to the client computer system to start the transaction;
initiating said selecting the number of empty packets for en-queuing in the FIFO and the number of packets for en-queuing in the FIFO; and
instantiating the FIFO.

19. The non-transitory computer readable storage medium of claim 11, wherein the interval is a standard isochronous interval.

20. The non-transitory computer readable storage medium of claim 11, further comprising:

receiving, by the hypervisor, a set alt setting 0 command from the virtual USB device driver and transmitting, by the hypervisor, a stop stream command to the client computer system.

* * * * *